United States Patent
Yoo et al.

(10) Patent No.: US 10,735,983 B2
(45) Date of Patent: Aug. 4, 2020

(54) APPARATUS AND METHOD FOR COMPENSATING PHASE NOISE IN A WIRELESS COMMUNICATION SYSTEM

(71) Applicant: Samsung Electronics Co., Ltd., Suwon-si, Gyeonggi-do (KR)

(72) Inventors: Hyunil Yoo, Suwon-si (KR); Jaewon Kim, Seoul (KR); Jeehwan Noh, Suwon-si (KR); Hyunseok Ryu, Yongin-si (KR); Jiyun Seol, Seongnam-si (KR); Hyukmin Son, Hanam-si (KR); Hyunkyu Yu, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 100 days.

(21) Appl. No.: 15/806,860

(22) Filed: Nov. 8, 2017

(65) Prior Publication Data
US 2018/0132122 A1 May 10, 2018

(30) Foreign Application Priority Data
Nov. 8, 2016 (KR) .................. 10-2016-0148383

(51) Int. Cl.
*H04L 1/00* (2006.01)
*H04W 24/08* (2009.01)
(Continued)

(52) U.S. Cl.
CPC .......... *H04W 24/08* (2013.01); *H04L 5/0051* (2013.01); *H04L 5/0053* (2013.01);
(Continued)

(58) Field of Classification Search
CPC ............ H04W 24/08; H04W 56/0035; H04W 56/004; H04W 56/00; H04L 5/0053; H04L 5/00
See application file for complete search history.

(56) References Cited

U.S. PATENT DOCUMENTS 9,054,933 B2    6/2015  Arambepola et al.
2007/0025461 A1* 2/2007  Park .................. H04L 25/03159
                                                    375/260
(Continued)

FOREIGN PATENT DOCUMENTS

KR    10-2017-0089738 A    8/2017
WO    WO2018064313 A1 *   4/2018    ............... H04L 5/00

OTHER PUBLICATIONS

CATT, "Discussion on phase tracking RS for NR", R1-1611382; 3GPP TSG RAN WG1 Meeting #87, pp. 1-5, Nov. 14, 2016, Reno, USA.
(Continued)

*Primary Examiner* — Abdelillah Elmejjarmi
(74) *Attorney, Agent, or Firm* — Jefferson IP Law, LLP

(57) ABSTRACT

The present disclosure relates to a fifth generation (5G) or pre-5G system to be provided to support a higher data transmission rate since fourth generation (4G) communication systems like long term evolution (LTE). A system and method for compensating phase noise of a terminal in support of the system is provided. The method includes measuring first channel state information (CSI) using a reference signal transmitted from a base station, estimating second CSI from the first CSI using a first type reference signal for compensating a common phase error (CPE) and a second type reference signal for compensating the CPE and inter carrier interference (ICI), and feeding back the estimated second CSI to the base station.

16 Claims, 14 Drawing Sheets

(51) Int. Cl.
  *H04L 27/00* (2006.01)
  *H04L 27/26* (2006.01)
  *H04L 5/00* (2006.01)
  *H04L 25/02* (2006.01)
  *H04W 56/00* (2009.01)

(52) U.S. Cl.
  CPC ........ *H04L 5/0057* (2013.01); *H04L 25/0224* (2013.01); *H04L 27/0014* (2013.01); *H04L 27/2675* (2013.01); *H04W 56/004* (2013.01); *H04W 56/0035* (2013.01); *H04L 27/2657* (2013.01)

(56) References Cited

U.S. PATENT DOCUMENTS

2014/0247749 A1    9/2014  Kim et al.
2017/0214518 A1    7/2017  Oh et al.
2017/0302352 A1*  10/2017  Islam .................. H04B 7/0626

OTHER PUBLICATIONS

National Instruments, "Study of Time and Frequency Density of Phase Noise RS", R1-1612624; 3GPP TSG RAN WG1 Meeting #87, pp. 1-9, Nov. 14, 2016, Reno, USA.
LG Electronics, "Discussion on Phase Tracking RS for UL transmission", R1-1611810; 3GPP TSG RAN WG1 Meeting #87, pp. 1-7, Nov. 14, 2016, Reno, USA.
Samsung, "Frequency domain pattern for RS for phase tracking", R1-1612499; 3GPP TSG RAN WG1 #87, pp. 1-6, Nov. 14, 2016, Reno, USA.

* cited by examiner

APPARATUS AND METHOD FOR COMPENSATING PHASE NOISE IN A WIRELESS COMMUNICATION SYSTEM

CROSS-REFERENCE TO RELATED APPLICATION(S)

This application claims the benefit under 35 U.S.C. § 119(a) of a Korean patent application filed on Nov. 8, 2016, in the Korean Intellectual Property Office and assigned Serial number 10-2016-0148383, the entire disclosure of which is hereby incorporated by reference.

TECHNICAL FIELD

The present disclosure relates to a method and an apparatus for compensating phase noise. More particularly, present disclosure relates to a method and an apparatus for performing channel state information (CSI) feedback in consideration of phase noise.

BACKGROUND

To meet a demand for radio data traffic that is on an increasing trend since commercialization of a fourth generation (4G) communication system, efforts to develop an improved fifth generation (5G) communication system or a pre-5G communication system have been conducted. For this reason, the 5G communication system or the pre-5G communication system is called a beyond 4G network communication system or a post long term evolution (LTE) system.

To achieve a high data rate, the 5G communication system is considered to be implemented in a very high frequency band (mmWave) band. To relieve a path loss of a radio wave and increase a transfer distance of the radio wave in the very high frequency band, in the 5G communication system, beamforming, massive multiple input and multiple output (MIMO), full dimensional MIMO (FD-MIMO), array antenna, analog beam-forming, and large scale antenna technologies have been discussed.

Further, to improve a network of the system, in the 5G communication system, technologies such as an evolved small cell, an advanced small cell, a cloud radio access network (cloud RAN), an ultra-dense network, a device-to-device communication (D2D), a wireless backhaul, a moving network, cooperative communication, coordinated multi-points (CoMP), and reception interference cancellation have been developed.

In addition to this, in the 5G system, hybrid FSK and QAM modulation (FQAM) and sliding window superposition coding (SWSC) that are an advanced coding modulation (ACM) scheme and a filter bank multi carrier (FBMC), a non-orthogonal multiple access (NOMA), and a sparse code multiple access (SCMA) that are an advanced access technology, and so on, have been developed.

To estimate a phase error in a wireless communication system based on an orthogonal frequency-division multiplexing (OFDM), a common phase error (CPE) commonly affecting all OFDM subcarriers is estimated using a reference signal in a frequency domain and compensated, and a phase error is estimated in a symbol unit using a cyclic prefix in a time domain and compensated, thereby reducing an inter-carrier interference (ICI).

However, if the phase error is greatly changed within the symbol, the effect of the inter-carrier interference cannot be reduced even if the phase error is compensated using the cyclic prefix in the time domain. In particular, in the communication system using the very high frequency, the phase error greatly occurs due to characteristics of a radio frequency integrated circuit (RFIC), and therefore the degradation in performance due to the inter-carrier interference cannot be prevented only by the phase error estimation in the symbol unit.

The above information is presented as background information only, to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages, and to provide at least the advantages described below. Accordingly, an aspect of the present disclosure is to provide an apparatus and method to compensate a CPE commonly affecting all OFDM subcarriers and a phase error, thereby reducing an ICI.

In accordance with an aspect of the present disclosure, a method for compensating phase noise of a terminal is provided. The method includes measuring first CSI using a reference signal transmitted from a base station, estimating second CSI from the first CSI using a first type reference signal for compensating a CPE and a second type reference signal for compensating the CPE and ICI, and feeding back the estimated second CSI to the base station.

In accordance with an aspect of the present disclosure, the method may further include receiving the first type reference signal from the base station together with first data, and receiving the second type reference signal from the base station together with second data.

In accordance with an aspect of the present disclosure, the method may further include setting a first modulation and coding scheme (MCS) level, a second MCS level, and a third MCS level for compensating the phase noise, in which the first MCS level may correspond to a case where no reference signal for compensating the phase noise is required, the second MCS level may correspond to the first type reference signal, and the third MCS level may correspond to the second type reference signal.

In accordance with an aspect of the present disclosure, the estimating of the second CSI may include compensating phase noise for first data using the first type reference signal and calculating a first error vector magnitude (EVM) value according to a compensation result, compensating phase noise for second data using the second type reference signal and calculating a second EVM value according to a compensation result, and calculating a reference value representing a difference between the first EVM value and the second EVM value.

In accordance with an aspect of the present disclosure, the estimating of the second CSI may further include estimating the second CSI using the first CSI, the reference value, and a cyclic redundancy check (CRC) value measured during decoding of the first data and the second data.

In accordance with another aspect of the present disclosure a method for compensating phase noise of a base station is provided. The method includes transmitting a reference signal to a terminal so that the terminal measures first CSI, transmitting a first type reference signal for compensating a CPE and a second type reference signal for compensating the CPE and ICI to the terminal so that the terminal estimates second CSI from the first CSI, and receiving the estimated second CSI from the terminal.

In accordance with another aspect of the present disclosure a terminal for compensating phase noise is provided. The terminal includes a transceiver configured to transmit and receive a signal, and a controller or at least one processor configured to measure first CSI using a reference signal transmitted from a base station, estimate second CSI from the first CSI using a first type reference signal for compensating a CPE and a second type reference signal for compensating the CPE and ICI, and feeding back the estimated second CSI to the base station.

In accordance with another aspect of the present disclosure a base station for compensating phase noise is provided. The base station includes a transceiver configured to transmit and receive a signal, and a controller or at least one processor configured to control the transceiver to transmit a reference signal to a terminal so that the terminal measures first CSI, transmit a first type reference signal for compensating a CPE and a second type reference signal for compensating the CPE and ICI to the terminal so that the terminal estimates second CSI from the first CSI, and receive the estimated second CSI from the terminal.

The method and apparatus for compensating phase noise in accordance with aspects of the present disclosure can compensate the signal distortion due to the phase noise and prevent the degradation in performance due to the phase noise.

The method and apparatus for compensating phase noise in accordance with aspects of the present disclosure can compensate the phase noise to improve the data rate at the high-order MCS level.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
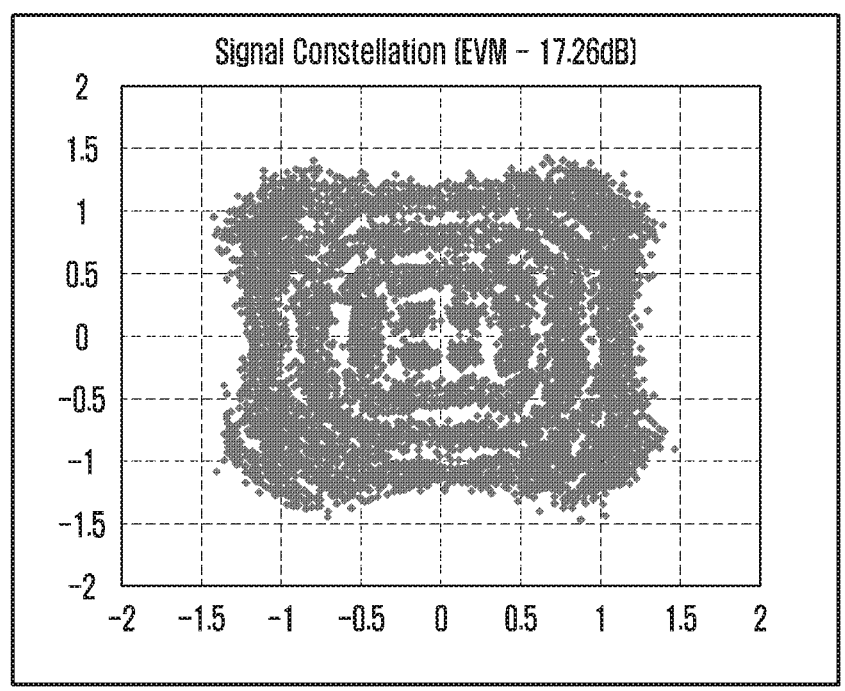
FIG. 1 is a diagram showing an effect of phase noise in a certain modulation scheme according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions constructions may be omitted for clarity and conciseness.

The terms and words used in the following description and claims are not limited to the bibliographical meanings, but are merely used to enable a clear and consistent understanding of the present disclosure. Accordingly, it should be apparent to those skilled in the art that the following description of various embodiments of the present disclosure is provided for illustration purpose only, and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reason, some components are exaggerated, omitted, or schematically illustrated in the accompanying drawings. Further, the size of each component does not exactly reflect its real size. In each drawing, the same or corresponding components are denoted by the same reference numerals.

Various advantages and features of the present disclosure and methods accomplishing the same will become apparent from the following detailed description of embodiments with reference to the accompanying drawings. However, the present disclosure is not limited to the embodiments disclosed herein but will be implemented in various forms. The embodiments have made disclosure of the present disclosure complete and are provided so that those skilled in the art can easily understand the scope of the present disclosure. Therefore, the present disclosure will be defined by the scope of the appended claims. Like reference numerals throughout the description denote like elements.

In this case, it may be understood that each block of processing flowcharts and combinations of the flowcharts may be performed by computer program instructions, such as non-transient computer program instructions. Since these computer program instructions may be mounted in processors for a general computer, a special computer, or other programmable data processing apparatuses, these instructions executed by the processors for the computer or the other programmable data processing apparatuses create means performing functions described in block(s) of the flowcharts. Since these computer program instructions may also be stored in a computer or computer readable memory of a computer or other programmable data processing apparatuses in order to implement the functions in a specific scheme, the computer program instructions stored in the computer or computer readable memory may also produce manufacturing articles including instruction means performing the functions described in block(s) of the flowcharts. Since the computer program instructions may also be mounted on the computer or the other programmable data processing apparatuses, the instructions performing a series of operational steps on the computer or the other programmable data processing apparatuses to create processes executed by the computer to thereby execute the computer or the other programmable data processing apparatuses may also provide steps for performing the functions described in block(s) of the flowcharts.

In addition, each block may indicate modules, segments, or codes including one or more executable instructions for executing a specific logical function(s). Further, it is to be noted that functions mentioned in the blocks occur regardless of a sequence in some embodiments. For example, two blocks that are consecutively illustrated may be simultaneously performed in fact or be performed in a reverse sequence depending on corresponding functions.

Here, the term '-unit' used in the present embodiment means software or hardware components such as field programmable gate array (FPGA) and application-specific integrated circuit (ASIC) and the '~unit' performs any corresponding role. However, the meaning of the '~unit' is not limited to software or hardware. The '~unit' may be configured to be in a storage medium that may be addressed and may also be configured to reproduce one or more processors. Accordingly, for example, the '~unit' includes components such as software components, object oriented software components, class components, and task components and processors, functions, attributes, procedures, subroutines, segments of program code, drivers, firmware, microcode, circuits, data, databases, data structures, tables, arrays, and variables. The functions provided in the components and the '~units' may be combined with a smaller number of components and the '~units', or may be further separated into additional components and the '~units'. In addition, the components and the '~units' may also be implemented to reproduce one or more central processing units (CPUs) within a device or a security multimedia card.

Hereinafter, embodiments of the present disclosure will be described in detail with reference to the accompanying drawings. When it is decided that a detailed description for the known function or configuration related to the present disclosure may obscure the gist of the present disclosure, the detailed description therefor will be omitted. Further, the following terminologies are defined in consideration of the functions in the present disclosure and may be construed in different ways by the intention or practice of users and operators. Therefore, the definitions thereof should be construed based on the contents throughout the specification.

FIG. 1 is a diagram showing an effect of phase noise in a certain modulation scheme according to an embodiment of the present disclosure.

Referring to FIG. 1, an effect of phase noise on a 64 quadrature amplitude modulation (QAM) transmission is shown. The phase noise may generate a CPE, and an ICI. In a wireless communication system, the CPE needs to be compensated to compensate phase noise, and the ICI needs to be compensated only in case of supporting a high MCS level.

FIG. 1 shows the effect of the CPE and the ICI due to the phase noise upon the 64 QAM transmission. As shown in FIG. 1, it can be confirmed that EVM performance is significantly degraded due to the effect of the phase noise. It can be appreciated that a phase of each symbol on a constellation is rotated due to the effect of the CPE and the constellation is distorted.

Figure 2:
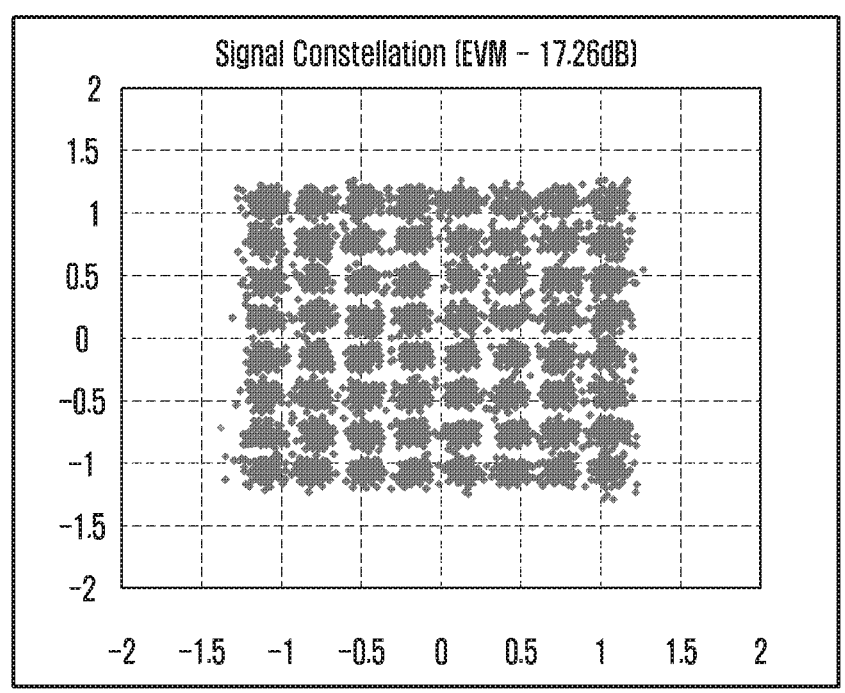
FIG. 2 is a diagram showing a case where a common phase error among phase noise is compensated in a certain modulation scheme according to an embodiment of the present disclosure.

FIG. 2 is a diagram showing a case where a common phase error among phase noise is compensated in a certain modulation scheme according to an embodiment of the present disclosure.

Referring to FIG. 2, a case is shown where the CPE due to the phase noise upon a 64 QAM transmission is compensated. Compared to the performance shown in FIG. 1, the CPE is compensated, so that the phase rotation of each symbol on the constellation no longer appears but the distortion of the symbol due to each ICI may still exist.

Referring to FIG. 2, it can be predicted that the distortion of each symbol may not be compensated by using a high-order modulation scheme. That is, when communication is performed using an MCS level lower than a certain level, even if there is symbol distortion to some extent, decoding may be performed. However, when high-speed communication is performed using a high MCS level, the symbol distortion may not be compensated by channel coding, or the like. The symbol distortion due to the phase noise is more serious than when using a very high frequency band.

If the ICI is compensated, the EVM performance will exceed −30 dB even in a noise environment.

Referring to both FIGS. 1 and 2, the MCS level may be divided into the environment where no phase noise reference signal (RS) is required, that is, the low MCS level (e.g., 16 quadrature phase shift keying (QPSK)) and the environment (e.g., 16 QAM) where only the CPE is compensated to transmit/receive a signal, that is, the environment (e.g., 64 QAM) that the CPE and the ICI are both compensated to support the high MCS level.

The present disclosure provides in part, a CSI feedback method considering phase noise in an orthogonal frequency-division multiplexing (OFDM)-based system.

The phase noise may be divided into a CPE and an ICI. Here, the reference signal (RS) for estimating and compensating the phase noise may be designed differently depending on the application.

That is, a first RS capable of estimating only CPE and a second RS capable of estimating both of the CPE and the ICI may be designed. The second RS may have an overhead larger than that of the first RS. Here, the larger overhead means that the number of subcarriers to which the RS for estimating the phase noise is allocated is large. The second RS has a very high density allocated to the time/frequency as compared to the first RS, and therefore may be restrictively used for a data channel for supporting a high order MCS level.

In the specification of the present disclosure described below, the first RS for compensating the CPE component of the phase noise may be referred to as a first type RS and the second RS for compensating for both of the CPE and the ICI of the phase noise may be referred to as the second type RS.

Figure 3:
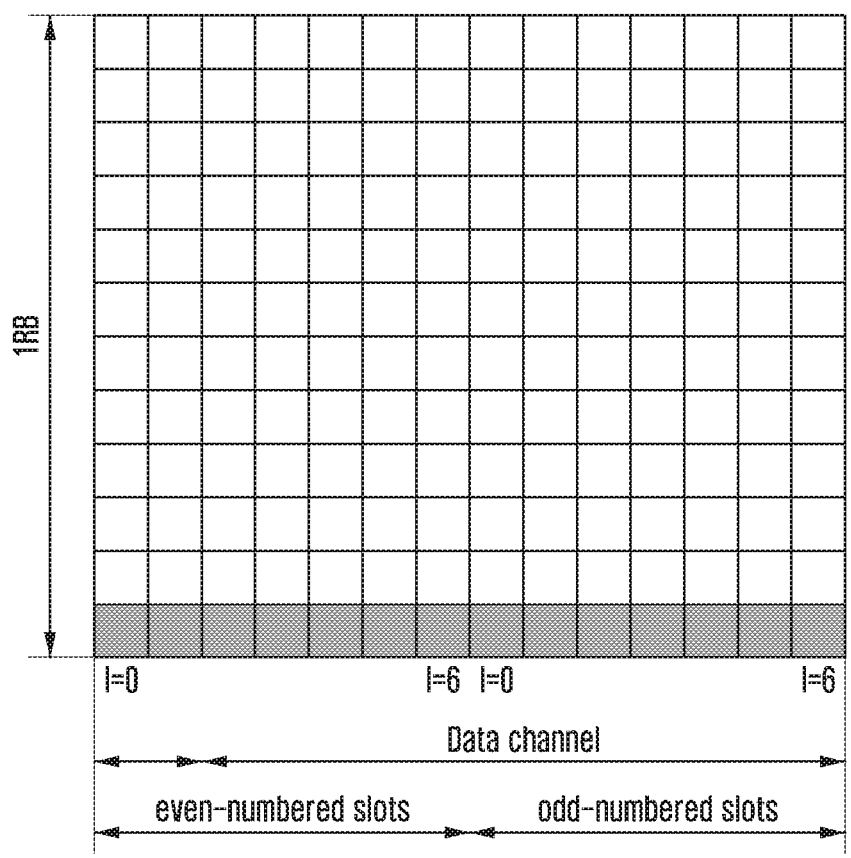
FIG. 3 is a diagram showing an example of a pattern of a first type reference signal (RS) according to an embodiment of the present disclosure.

FIG. 3 is a diagram showing an example of a pattern of a first type RS according to an embodiment of the present disclosure.

Referring to FIG. 3, the first type RS may be consecutively allocated for each OFDM symbol. Therefore, the terminal may estimate an inter-symbol phase difference using the first type RS. Also, the first type RS may be allocated to a single (one) subcarrier. The terminal may compensate the inter-symbol phase difference estimated using the first type RS based on the channel estimated by the DMRS, thereby compensating the CPE for each OFDM symbol.

Figure 4:
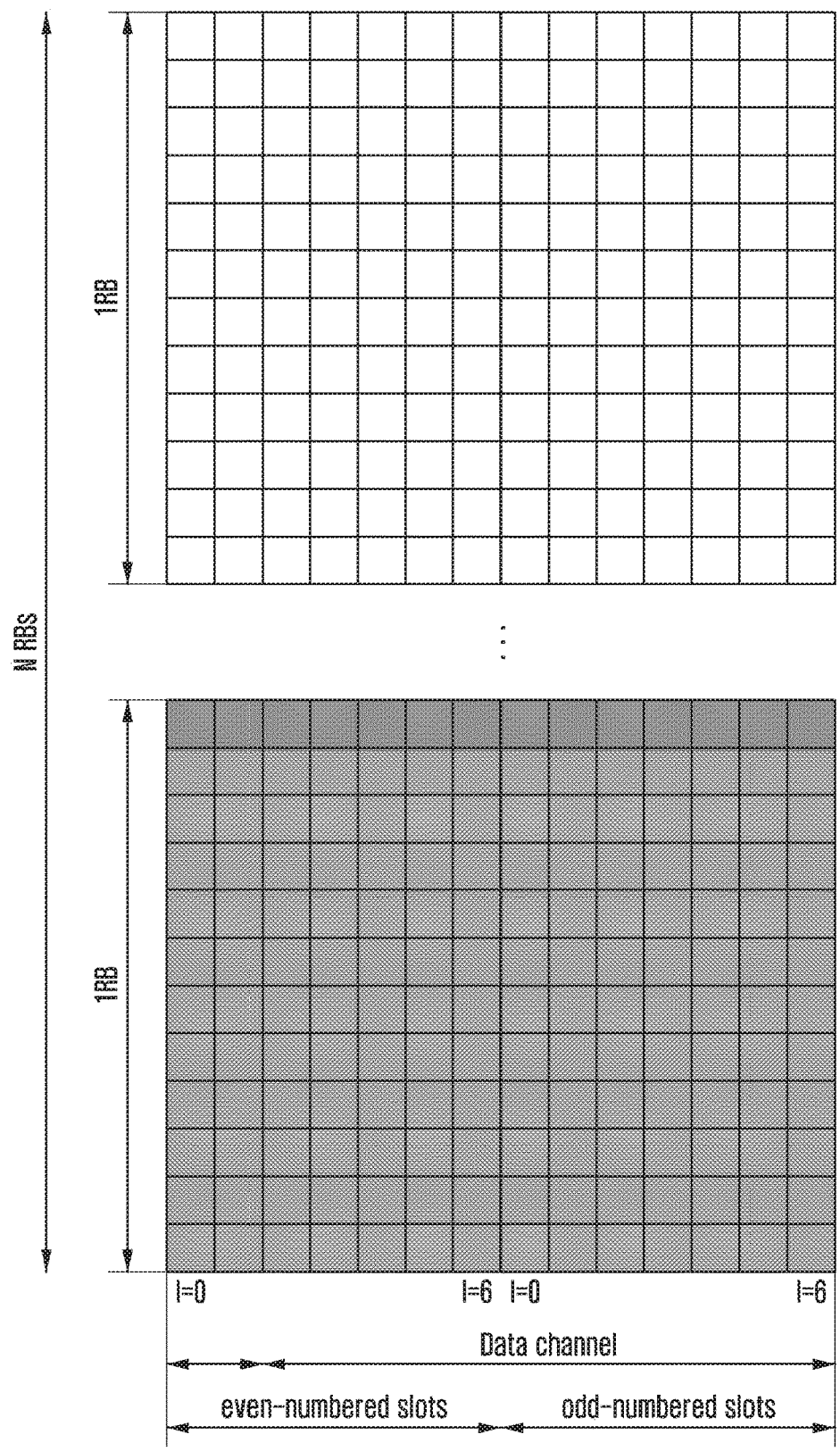
FIG. 4 is a diagram showing an example of a pattern of a second type RS according to an embodiment of the present disclosure.

FIG. 4 is a diagram showing an example of a pattern of a second type RS according to an embodiment of the present disclosure.

Referring to FIG. 4, the second type RS is consecutively allocated for each OFDM symbol like the first type RS, but may consist of at least two subcarriers in N-RB. The second type RS shown in FIG. 4 is only one example in which the second type RS may be mapped, and may be mapped to physical resources in a modified form other than the type shown in FIG. 4.

The second type RS for compensating the CPE and the ICI due to the phase noise requires RS overhead larger than that of the first type RS. That is, the second type RS requires a plurality of subcarriers in the N-RB. Therefore, it is inefficient to transmit the second type RS for the control channel and the reference signal (e.g., DMRS, CSI-RS, and the like). For example, assuming that the second type RS is transmitted through four RBs, it may be very inefficient to use the second type RS when the control channel is transmitted through two RBs.

The information on the second type RS pattern may be previously configured in a terminal and a base station. For example, the information on through which RB the RS is transmitted, through which subcarrier the RS is transmitted if the RS is transmitted through one RB, and through how many RBs the RS is transmitted if the RS is transmitted through a plurality of RBs, or the like, may be configured in the terminal and the base station in advance.

Alternatively, the base station may configure the information on the second type RS pattern in the terminal through higher layer signaling. The information on the second type RS pattern notified through the higher layer signaling may include at least one of the above information.

Figure 5:
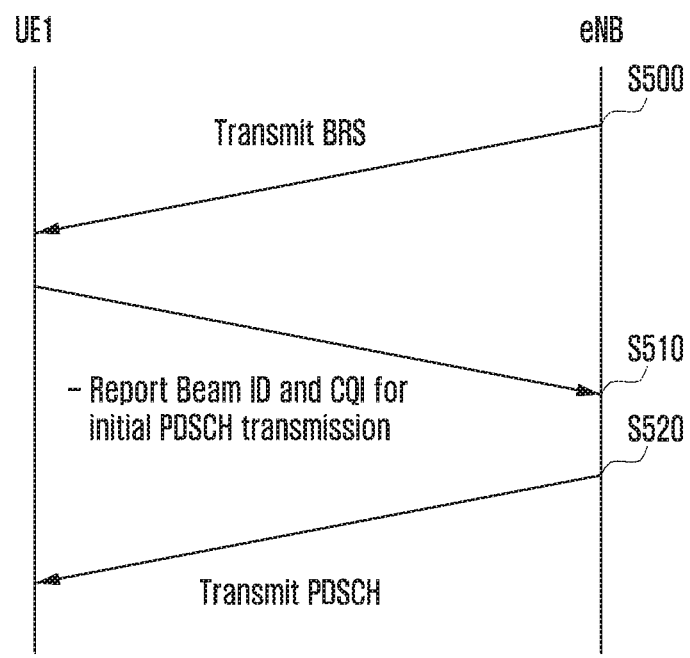
FIG. 5 is a diagram showing an example of a process for acquiring CSI required for physical downlink shared channel (PDSCH) transmission according to an embodiment of the present disclosure.

FIG. 5 shows an embodiment of a process for obtaining CSI necessary for a physical downlink shared channel (PDSCH) transmission according to an embodiment of the present disclosure.

Referring to FIG. 5, the CSI is obtained using beam measurement RS (BRS) transmitted for beam measurement. Like the 5G system, if a beamforming technique is used, the base station eNB needs to determine in which direction the beam is used by the terminal UE1 and the base station eNB, to obtain the maximum channel gain. For the measurement, the base station eNB may transmit a reference signal for each beam through beam sweeping, which may be referred to as BRS.

The base station eNB transmits the BRS to the terminal UE1 at operation S500, and the terminal UE1 may generate a beam identification (ID) having the maximum channel gain using the BRS and channel quality indicator (CQI) using a received signal strength received through a beam having the beam ID. The terminal UE1 reports the beam ID and the CQI for the initial PDSCH transmission to the base station eNB at operation S510.

The base station eNB transmits the PDSCH to the terminal UE1 in consideration of the beam ID and the CQI at operation S520. Preferably, the base station eNB may modulate the PDSCH depending on the MCS level corresponding to the CQI that the terminal UE1 feeds back and transmit the fed back PDSCH to the terminal UE1, by using the beam having the beam ID that the terminal feeds back.

Figure 6:
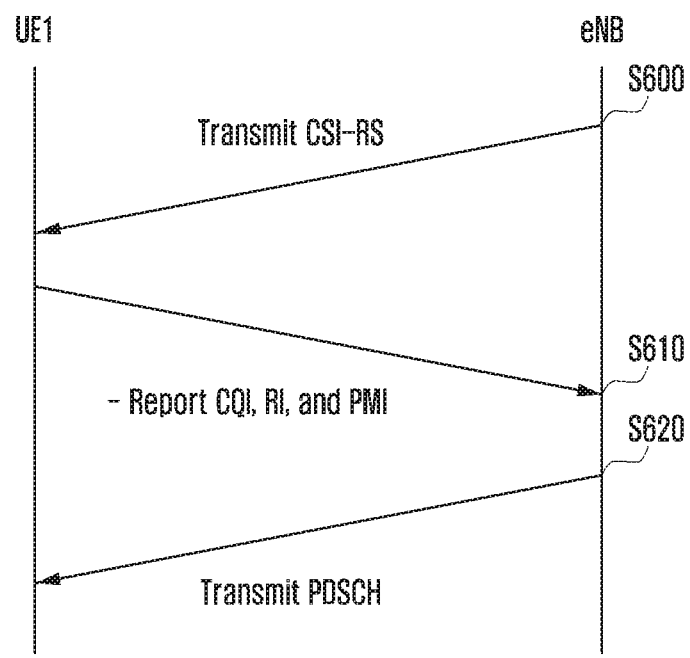
FIG. 6 is a diagram showing another example of a process for acquiring CSI required for PDSCH transmission according to an embodiment of the present disclosure.

FIG. 6 is a diagram showing another example of a process for acquiring CSI required for PDSCH transmission according to an embodiment of the present disclosure. In FIG. 5, if the CSI is acquired through the BRS, in particular, the CSI is obtained using the CSI-RS in FIG. 6.

Referring to FIG. 6, the base station eNB may transmit the CSI-RS to the terminal UE1 at operation S600. To this end, the base station may establish configuration information related to the CSI-RS transmission to the terminal through the higher layer signaling. For example, the base station eNB may configure information on the number of antenna ports, sub-frames, and RB resources for transmitting the CSI-RS in the terminal.

The terminal UE1 reports CQI, RI, and PMI measured using the CSI-RS to the base station eNB at operation S610.

The base station eNB transmits the PDSCH to the terminal UE1 in consideration of the CQI, RI, and PMI at operation S620.

Referring to both FIGS. 5 and 6, information such as CSI (CQI, RI, PMI, or Beam ID) is required for the PDSCH transmission. To this end, the transmission of the RS such as BRS or CSI-RS needs to be performed first. In general, however, the RS suffers from code division multiplexing (CDM)/frequency division multiplexing (FDM) in order to identify between an antenna port and a cell, so that the RS cannot consecutively be allocated in a frequency domain. That is, since the BRS and the CSI-RS cannot be consecutively allocated to two or more subcarriers as shown in FIG. 4, only the CPE may be compensated and the ICI may not be estimated and compensated.

Accordingly, it is impossible to estimate and compensate the ICI due to the phase noise only by using the RS for measuring the CSI. Therefore, the RS for measuring the CSI is used to measure only the CSI using the constellation whose only CPE is compensated, as shown in FIG. 2. As a result, there may be a problem in that in the case of using the RS for measuring the CSI, data cannot be transmitted/received by the MSC level above a certain level.

Figure 7A:
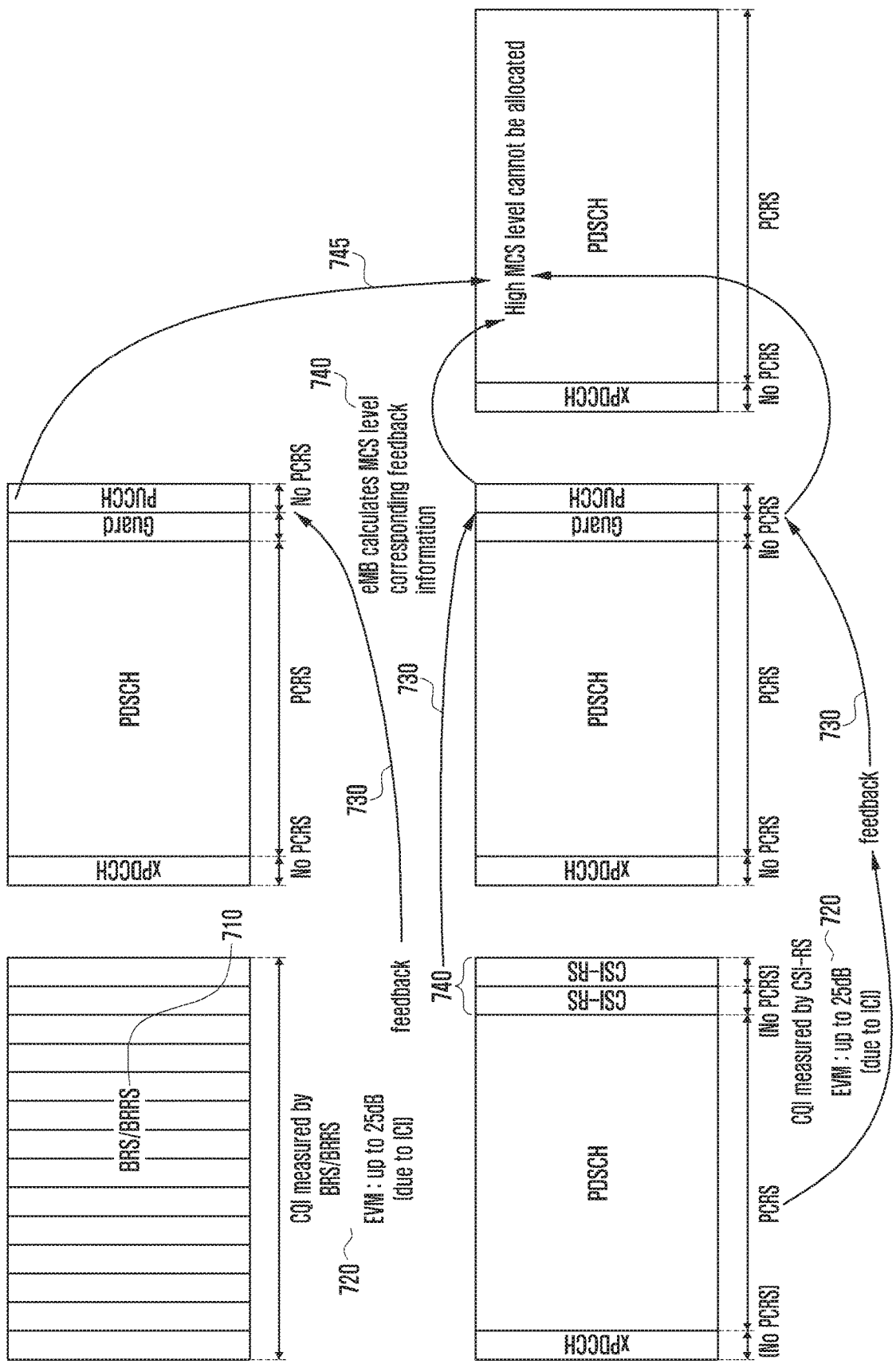
FIGS. 7A and 7B are diagrams showing a process of transmitting PDSCH based on CSI estimated using beam measurement RS (BRS) and CSI-RS according to an embodiment of the present disclosure.
Figure 7B:
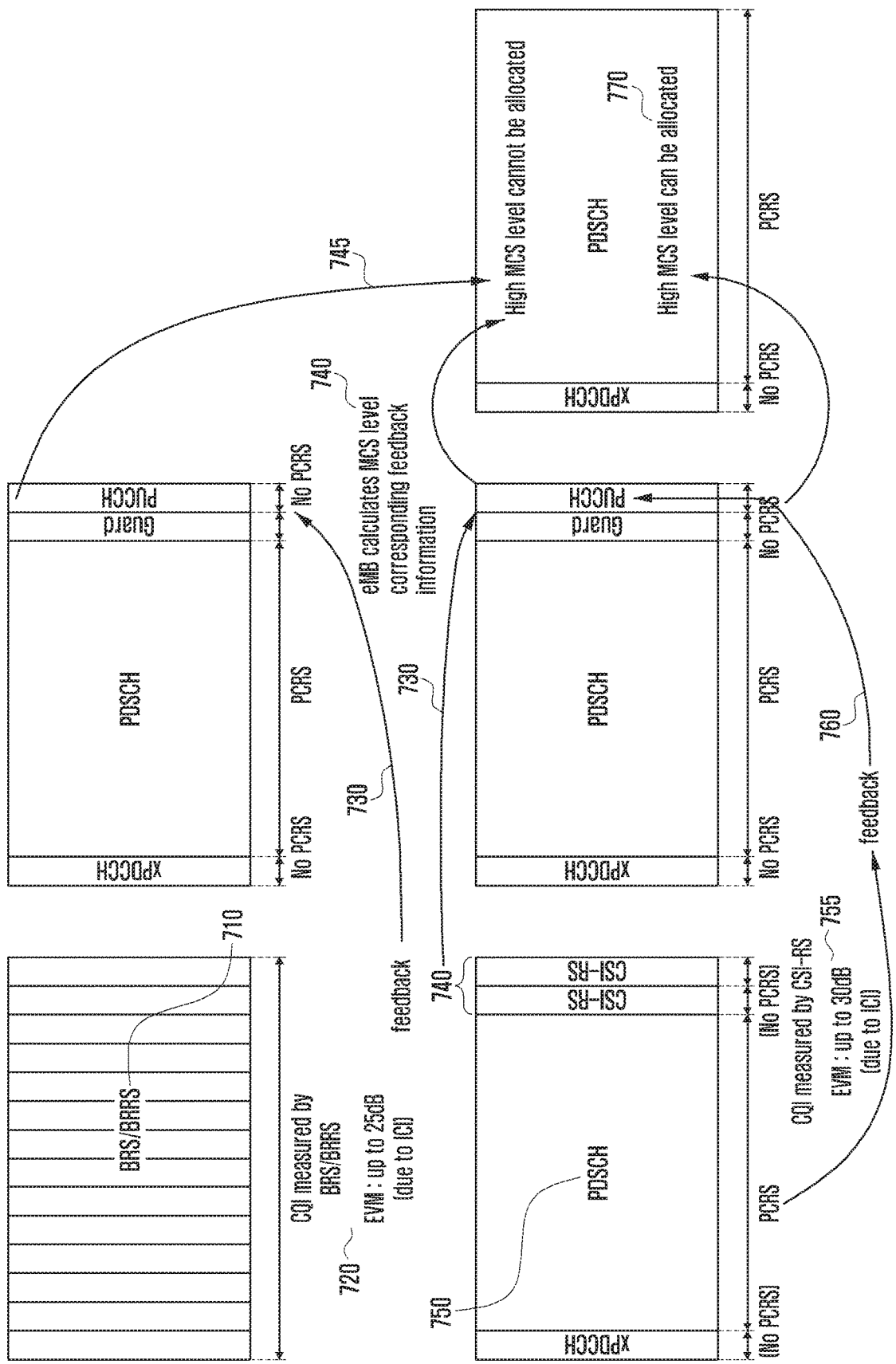

FIGS. 7A and 7B are diagrams showing a process of transmitting PDSCH based on CSI estimated using BRS and CSI-RS according to an embodiment of the present disclosure.

Referring to both FIGS. 7A and 7B, a terminal estimates the channel quality indicator/rank indicator/precoding matrix indicator (CQI/RI/PMI) or the like, using a beam reference signal at operation 710 or using a CSI-RS at operation 740 that a base station transmits at operation 720. Here, as described above, the BRS, the CSI-RS, or the like, cannot be transmitted with being evenly distributed on a frequency band as in the second type RS and therefore, the effect of the ICI due to the phase noise cannot be compensated. As a result, at operation 720, the terminal measures the CSI at a level where the EVM on the constellation is a maximum of 25 dB.

At operation 730, the terminal may feed back the measured CSI value to the base station through the PUCCH/PUSCH channel.

At operation 740, the base station determines the MCS level of the PDSCH to be transmitted to the terminal based on the CSI value.

According to the CSI feedback and data transmission procedure through operations 710 to 740, the CSI value fed back to the base station by the terminal uses a signal of which only the CPE of the CPE and the ICI occurring due to the phase noise is compensated. Accordingly, the base station may not transmit data to the terminal using a high level MCS as at operation 745 because the EVM is a value measured at a maximum of 25 dB.

For addressing the above problem, there is a need for a method of compensating, by a terminal, CSI to feed back a CQI value estimated using CSI-RS to transmit a second type RS.

Accordingly, a method of properly compensating, by a terminal, CS to apply a high level MCS to PDSCH is required.

Figure 8:
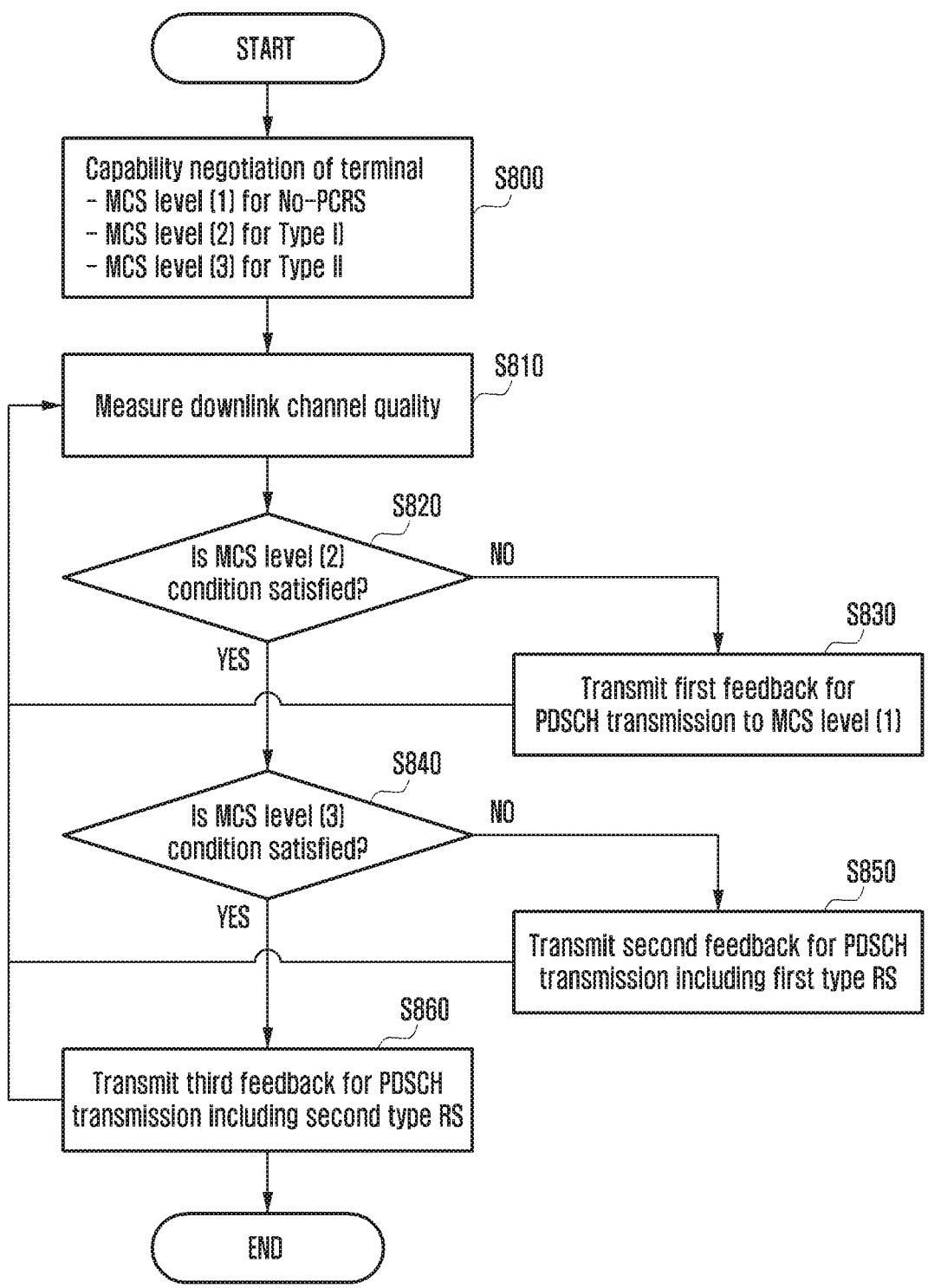
FIG. 8 is a flowchart showing a process in which a terminal transmits feedback related to a phase noise RS to a base station according to an embodiment of the present disclosure.

FIG. 8 is a flowchart showing a process in which a terminal transmits feedback related to a phase noise RS to a base station according to an embodiment of the present disclosure.

Referring to FIG. 8, a terminal performs a capability negotiation of a terminal for phase noise RS transmission with a base station in an initial connection at operation S800. That is, the terminal exchanges information on MCS level (1) at which phase noise RS is not transmitted, MCS level (2) for first type RS transmission, and MCS level (3) for second type RS transmission with a base station.

Thereafter, the terminal measures CSI using RS such as BRS and CSI-RS at operation S810.

If a CSI that does not satisfy the MCS level (2) is estimated at operation S820, the terminal may feed back a first CSI for PDSCH transmission at the MCS level (1) at operation S830.

If the measured CSI satisfies the MCS level (2), the terminal may determine whether the measured CSI satisfies the MCS level (3) at operation S840.

If the CSI satisfies the MCS level (2) and does not satisfy the MCS level (3) at operation S840, the terminal may feed back second CSI for transmitting the PDSCH including the first type RS at operation S850.

If the CSI satisfies the MCS level (3) as well as the MCS level (2) at operation S840, the terminal may feed back third CSI for transmitting the PDSCH including the second type RS at operation S860.

However, as described above, the RS (for example, BRS, CSI-RS) for the CSI measurement may compensate only the CPE, but does not compensate the ICI due to the phase noise, such that the CSI value satisfying the MCS level (3) condition may not be fed back.

Figure 9:
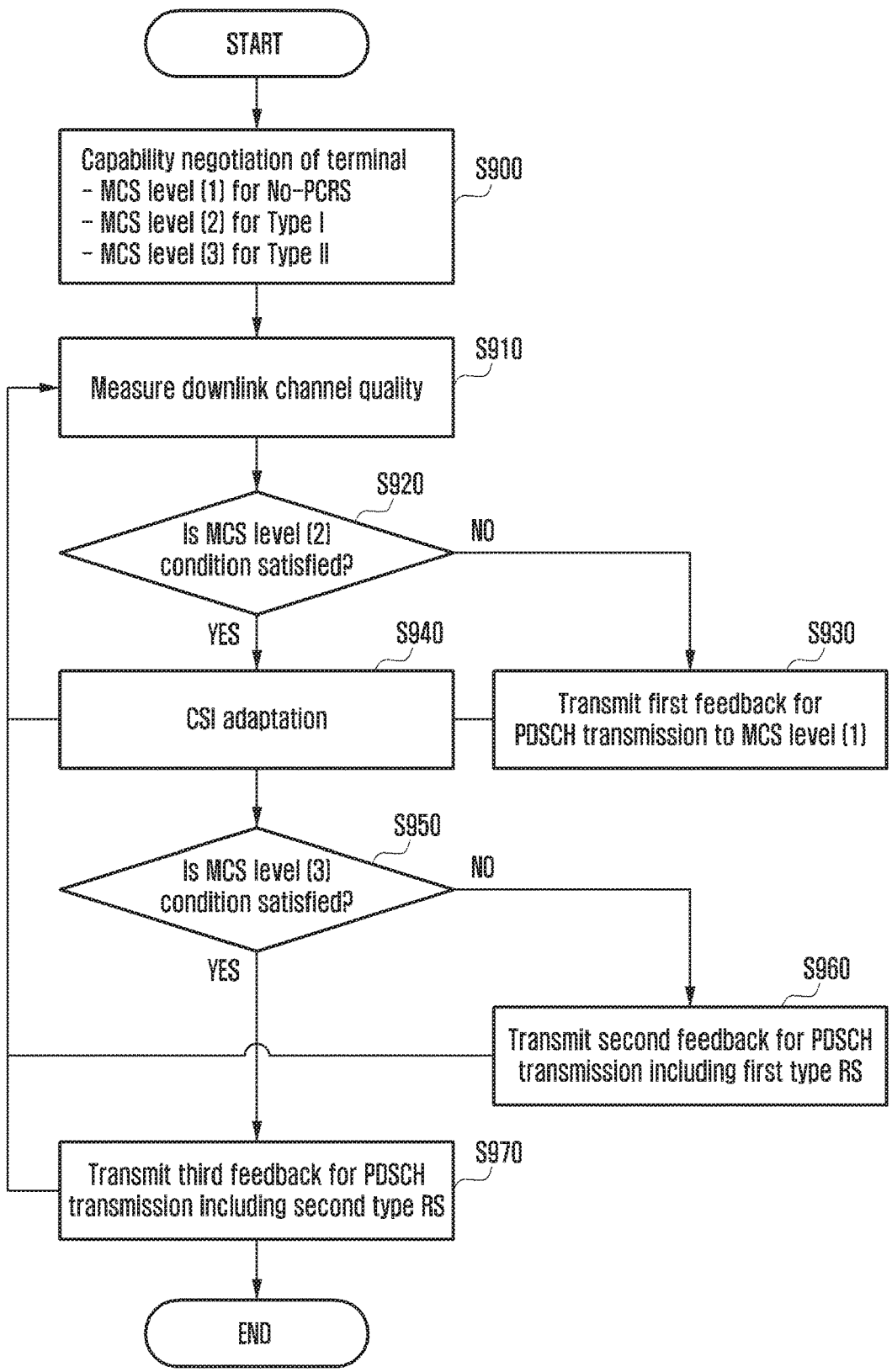
FIG. 9 is a flowchart showing a process in which a terminal compensates CSI to transmit feedback related to a phase noise RS to a base station according to an embodiment of the present disclosure.

Therefore, in the present disclosure, as illustrated in FIG. 9, a method of compensating CSI satisfying the MCS level (3) from the CSI value satisfying the MCS level (2) value and feeding back the compensated CSI to a base station is disclosed.

FIG. 9 shows a process of compensating (predicting) and feeding back, by a terminal, CSI using CSI (measured value) estimated from a BRS/CSI-RS to transmit a second type RS according to an embodiment of the present disclosure.

Referring to FIG. 9, a terminal performs a capability negotiation of a terminal for phase noise RS transmission with a base station in an initial connection at operation S900. That is, the terminal exchanges information on MCS level (1) at which phase noise RS is not transmitted, MCS level (2) for first type RS transmission, and MCS level (3) for second type RS transmission with a base station.

The terminal measures CSI using RS such as BRS and CSI-RS at operation S910.

If a CSI that does not satisfy the MCS level (2) is estimated at operation S920, the terminal may feed back the first CSI for PDSCH transmission at the MCS level (1) to the base station at operation S930.

If the CSI satisfying the MCS level (2) is estimated at operation S920, the terminal may estimate the CSI corresponding to the MCS level (3) using the CSI at operation S940.

Unlike FIG. 8, FIG. 9 is a flowchart illustrating a procedure including CSI adaptation. That is, the CSI adaptation procedure may denote a procedure of compensating the CSI value satisfying the MCS level (2) from the CSI value satisfying the MCS level (3) and feeding back the CSI value to the base station when the channel state is good to a certain level or higher. If the CSI satisfying the MCS level (3) is fed back to the base station, data may be transmitted and received according to the high MCS level.

Referring to FIG. 9, the terminal may compensate the CSI value (measured value) satisfying the MCS level (2) with the CSI value (predicted value) satisfying the MCS level (3) through the CSI adaptation.

If the CSI satisfies the MCS level (2), the terminal may determine whether the measured CSI satisfies the MCS level (3) at operation S950.

If the CSI satisfies the MCS level (2) and does not satisfy the MCS level (3) at operation S960, the terminal may feed back the second CSI for transmitting the PDSCH including the first type RS to the base station at operation S960.

If the CSI satisfies the MCS level (2) as well as the MCS level (3) at operation S950, the terminal feeds back third CSI for transmitting the PDSCH including the second type RS to the base station at operation S970.

Figure 10:
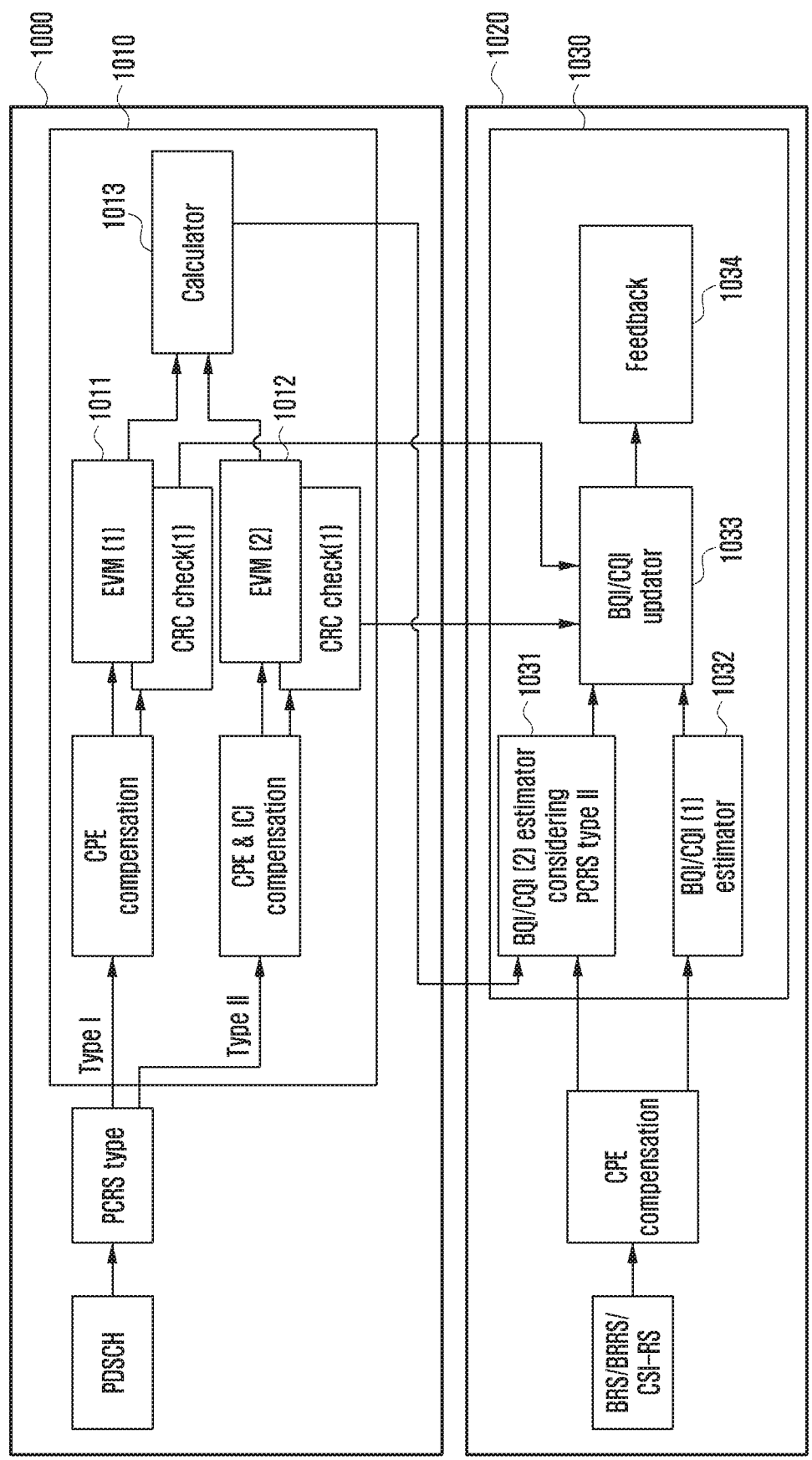
FIG. 10 is a diagram showing a method of compensating a CSI value corresponding to MCS level 2 with a CSI value corresponding to MCS level 3 in FIG. 9.

FIG. 10 is a diagram showing a method of compensating a CSI value (measured value) corresponding to an MCS level 2 with a CSI value (predicated value) corresponding to an MCS level 3 in FIG. 9.

An overall procedure for compensating the CSI value will be described first with reference to FIG. 10. This may largely include a first operation and a second operation.

In the first operation, the terminal may calculate a reference value for CSI compensation using a first type RS or a second type RS included in the PDSCH at operation 1000.

In a second operation, the terminal may feed back the CSI compensated using the CSI value measured from the reference signal (BRS, BRRS, CSI-RS, and the like) and the reference value to the base station at operation 1020.

The first operation will be described below in detail.

Reference numeral 1010 represents a block for calculating an EVM. The PDSCH received by the terminal may compensate phase noise using the first type RS and the second type RS, and calculate the EVM accordingly. Reference numeral 1011 represents a block for measuring EVM (1) whose CPE is compensated (i.e., ICI is not compensated) using the first type RS included in the received PDSCH. The EVM (1) may be input to a calculator block 1013.

Reference numeral 1012 represents a block for measuring EVM (2) whose CPE and ICI are both compensated using the second type RS included in the received PDSCH. The EVM (2) may also be input to the calculator block 1013.

According to the embodiment of the present disclosure, the two blocks 1011 and 1012 may be updated using the allocated RS every time the PDSCH is received.

The calculator block 1013 is a block for calculating a difference (dEVM) of each estimated EVM using the EVM 1 and the EVM 2 input through the blocks 1011 and 1012, respectively. In the present disclosure, the difference (dEVM) of the EVM may also be referred to as a reference value.

In this case, the dEVM value in the initial state before the terminal receives the PDSCH should be defined in advance. For example, the following Table 1 shows the EVM before and after compensation for phase noise.

TABLE 1

| Correction | EVM [dB] |
| --- | --- |
| None | −23.18 |
| Only CPE correction | −24.46 |
| CPE + ICI correction | −27.89 |

Here, the CPE compensated EVM value −24.46 is initially stored in the block 1011, and the CPE and ICI compensated EVM value −27.89 may be the value initially stored in the block 1012. The initial value of the PNCF may be set to be (27.89−24.46=3.43 dB) using the above values, and the value of the dEVM is updated each time the PDSCH is transmitted and the EVM is updated according to the allocated RS.

Next, the second operation will be described.

The second operation is an operation of compensating the CSI using the dEVM value estimated in the first operation. Reference numeral 1030 represents a block for compensating the CSI using the dEVM value estimated in the first operation.

The terminal may compensate the CPE when the BRS or the CSI-RS is received, and estimate the CSI (1) value accordingly. Then, the estimated CSI (1) value may be input to blocks 1031 and 1032, respectively.

The block 1031 may output a CSI (2) measurement value using the input CSI (1) value and the dEVM input through the calculator block 1013. The CSI (2) measurement is measured by the following Equation 1.

$$SINR_{n+1} = SINR_n + \alpha, \text{ where } \alpha \leq PNCF \quad \text{Equation 1}$$

Herein, $SINR_n$ denotes a SINR value (e.g., CSI (1)) estimated using RS, and $SINR_{n+1}$ denotes a SINR value (e.g., CSI 2) value) compensated using dEVM.

Here, α has a smaller value than dEVM, which may be indicated by the base station and may be set by the terminal itself.

An update block 1033 is a block that compensates the CSI using the measured $SINR_{n+1}$ value.

$$CSI(n) = CSI(n + \beta), \quad \text{Equation 2}$$

where $$\beta = \begin{cases} 1 & \text{if CRC free for } n \text{ times} \\ -1 & \text{if CRC error for } n \text{ times} \end{cases}$$

$$CSI(n) = f(SINR_{n+1})$$

In the above Equation 2, CSI (n) may be obtained by using $SINR_{n+1}$ estimated at 1031. That is, the estimated $SINR_{n+1}$ and the CSI (n) may be in a constant function relationship.

Here, outer-loop adaptation according to a CRC state measured during the PDSCH decoding is performed in order to prevent performance deterioration due to uncertainty of the predicted value. A k value may be indicated by the base station or may be set by the terminal itself. That is, the terminal may feed back a CSI index by increasing or lowering the CSI index according to the estimated CRC.

To this end, the block 1033 for compensating the CSI may receive a CRC state from a CRC check (1) block in the block 1000. According to the above Equation 2, if the CRC state input in the CRC check (1) block is in the CRC free state for k times, the CSI index may be set to be increased and fed back. That is, the fact that the CRC state is CRC free state may mean that no CRC error has occurred during the PDSCH decoding, such that the CSI index having a higher value may be lowered. If the CSI index having a high value is fed back to the base station, the base station may allocate a high level MCS level to transmit data to the terminal.

However, if the CRC state input from the CRC check (1) block is the CRC error state just once for k times, the CSI index may be set to be lowered and fed back. That is, the fact that the CRC state is a CRC error state may mean that a CRC error has occurred during the PDSCH decoding, such that the CSI index having a high value may be lowered. If the CSI index having a low value is fed back to the base station, the base station may not allocate a high level MCS level to the terminal.

Although the present disclosure describes a simple outer-loop adaptation as an example, the present disclosure is not limited thereto and can be variously implemented according to design specifications.

The outer-loop link adaptation technique according to the related art is performed based on acknowledgement (ACK)/negative acknowledgement (NACK) information of the terminal at the base station, whereas in the present disclosure, the outer-loop algorithm for updating the CSI is performed at the terminal.

A feedback block 1034 is provided as a block that feeds back the estimated CSI information input from the update block 1033 to the base station.

According to another embodiment of the present disclosure, when the base station receives the CSI index corresponding to the MCS level (2), it may consider a scenario in which the second type RS is applied to the PDSCH. That is, as in a PDSCH region of 750 of FIG. 7B, the case of transmitting the second type RS to the PDSCH region may be considered.

When the channel is measured using the second type RS transmitted in the PDSCH region of 750, the CSI compensated for both of the CPE and the ICI occurring due to the phase noise may be fed back. In this case, since both of the CPE and the ICI are compensated, the EVM performance may be increased up to 30 dB or more at operation 755.

If the terminal feeds back the CSI measured using the second type RS transmitted in the PDSCH region of 750 to the base station at operation 760, the base station may transmit data to the terminal using the high level MCS as at operation 770.

According to another embodiment of the present disclosure, the base station may perform link adaptation through the fed back information.

That is, the terminal may feed back the CSI value measured from the BRS/CSI-RS to the base station. Then, the base station may determine which MCS level that the fed back CSI value corresponds to and determine whether to transmit the second type RS.

Here, the terminal needs to feed back information necessary for determining whether to allocate data to the terminal at a high MCS level, for example, a reference value for the CSI compensation to the base station. That is, the terminal may feed back to the base station the reference value corresponding to the difference between the result of measuring the EVM (1) whose CPE is compensated (i.e., the ICI is not compensated) using the first type RS transmitted from the base station and the result of measuring the EVM (2) whose both CPE and ICI are compensated using the second type RS.

There is a difference between the above-mentioned embodiments, in that the terminal directly compensates and updates the CSI value using the reference value and in the present example, the terminal feeds back the reference value to the base station.

In addition, according to the above-described embodiments, the CSI compensation process (i.e., the CSI compensation process according to the above Equation (2)) according to whether the CRC check state performed by the terminal is free/non-free may be performed by being replaced by the Ack/Nack that the base station receives from the terminal. For example, if the base station receives the Ack for the corresponding PDSCH from the terminal, the base station may be considered as the state in which the terminal succeeds in the CRC check, that is, is in the CRC free in above Equation (2). Similarly, if the base station receives the Nack for the corresponding PDSCH from the terminal, the base station may be considered as the state in which the terminal fails in the CRC check, that is, is in the CRC error in the above Equation (2).

According to another embodiment of the present disclosure as described above, the base station may perform the link adaptation based on the reference value fed back from the terminal and the ACK/NACK information on the PDSCH.

In yet another embodiment of the present disclosure, precoding may be performed differently according to the design of the RS for estimating the phase noise.

As a first method, the RS for estimating the phase noise may be applied with the same precoding as the demodulation reference signal (DMRS) and transmitted. In this case, since it is assumed that the channel of the phase noise RS and the channel of the DMRS coincide with each other, it is possible to improve the performance by applying the phase noise/residual frequency offset/Doppler shift, or the like, that can be estimated using the phase noise RS to a channel value estimated by the DMRS.

The second method is a method that does not apply precoding to the RS for estimating the phase noise. In this case, the estimation performance of the PDSCH transmission channel is more deteriorated than the first method, but a port for transmitting the phase noise RS may be commonly used, which is advantageous in that the overhead is greatly reduced.

In a third method, the RS for estimating the phase noise is not defined as described above, but the DMRS signal is used as it is. That is, the base station generates a sequence according to the port, allocates the DMRS to the subcarrier according to a physical mapping rule, and then allocates a signal for PTRS as a pre-allocated DMRS sequence. In this case, since the terminal can know the PTRS according to the sequence according to the allocated DMRS port, it is not necessary to define the separate signaling or sequence.

That is, assuming that the DMRS is 8 ports, the phase noise RS for the first method requires 8 orthogonal ports, and considering the second type RS, the overhead becomes very large. However, applying the second method, one port may be used, which has a great advantage in overhead.

Figure 11:
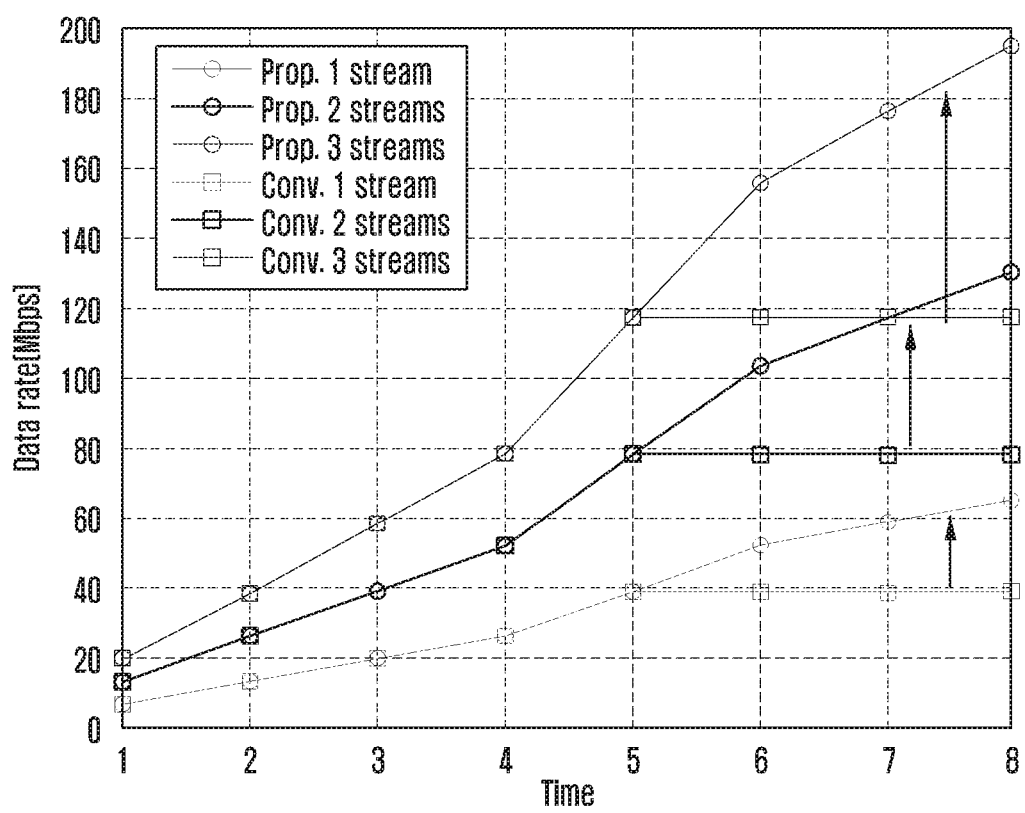
FIG. 11 a diagram showing a data rate according to a CSI compensation according to an embodiment of the present disclosure.

FIG. 11 a diagram showing a data rate according to a CSI compensation according to an embodiment of the present disclosure.

Referring to FIG. 11, in order to show an effect of the present disclosure, it is assumed that there is no other noise (inter-channel interference and white noise) other than phase noise. A bandwidth is assumed to be 20 MHz, and the MCS level for the data rate calculation is based on the LTE standard. A phase noise model refers to the agreed phase noise model for simulation in the $3^{rd}$ generation partnership project (3GPP) RAN1 #85 meeting.

Under the situation where the phase noise is present, the MCS level estimated using the RS may not satisfy the condition of the MCS level (3), so that the phenomenon the data rate cannot be increased beyond a certain level may be observed. By one or more of the methods in the present disclosure, the MCS level (3) may be fed back through the CSI adaptation process of the terminal using the PNCF/CRC, such that the data rate may be increased.

Figure 12:
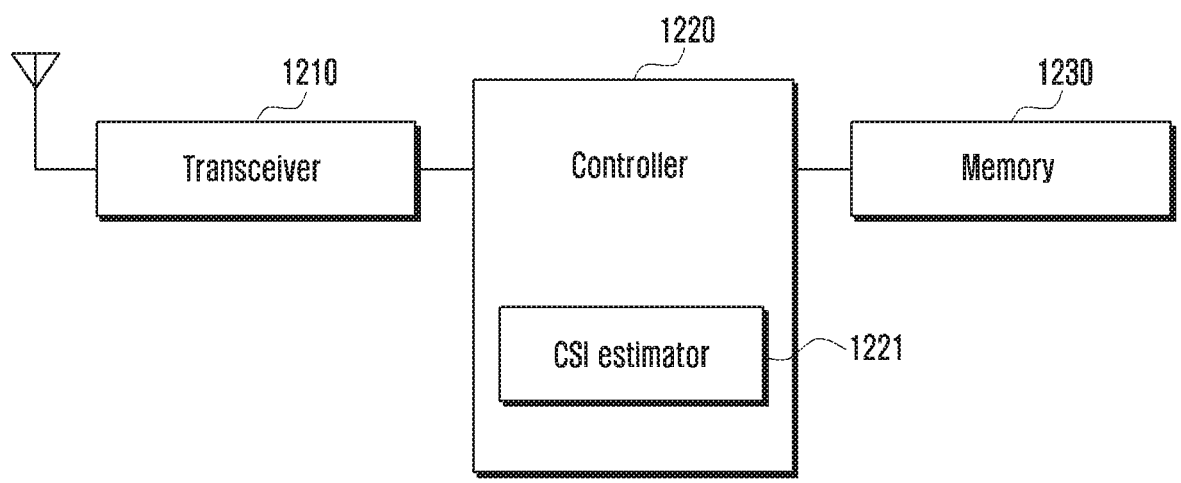
FIG. 12 is a diagram showing a structure of a terminal according to an embodiment of the present disclosure.

FIG. 12 is a diagram showing a structure of a terminal according to an embodiment of the present disclosure.

Referring to FIG. 12, a terminal may include a transceiver 1210, a controller or at least one processor 1220, and a memory 1230.

The transceiver 1210 serves to transmit/receive the corresponding data for wireless communication of the terminal. The transceiver 1210 may transmit/receive a signal to and from other nodes or the base station. The transceiver 1210 may also include an RF transmitter that up-converts and amplifies a frequency of the transmitted signal, an RF receiver that low-noise-amplifies the received signal and down-converts the frequency, or the like.

Further, the transceiver 1210 may receive data through the radio channel and output the received data to the controller 1220, and transmit the data output from the controller 1220 through the radio channel.

The controller 1220 may control the signal flow between the respective blocks so that the terminal may be operated according to any embodiment of the present disclosure. More specifically, the controller 1220 may measure the first CSI using the reference signal transmitted from the base station, estimate the second CSI from the first CSI, and feed back the estimated second CSI to the base station.

The controller 1220 may further include a CSI estimator 1221 to perform the function. The CSI estimator 1221 may use a first type reference signal for compensating a CPE and a second type reference signal for compensating the CPE and ICI to estimate the second CSI from the first CSI.

Specifically, the CSI estimator 1221 may compensate the phase noise for the first data using the first type reference signal, calculate a first EVM value according to the compensation result, compensate the phase noise for the second data using the second type reference signal, calculate a second EVM value according to the compensation result, and calculate a reference value indicating a difference between the first EVM value and the second EVM value.

Thereafter, the CSI estimator 1221 may estimate the second CSI using the first CSI, the reference value, and a CRC value measured during the decoding of the first and second data.

The controller 1220 may control the transceiver 1210 to receive the first type reference signal from the base station together with the first data and receive the second type reference signal from the base station together with the second data.

In addition, the controller 1220 may set a first MCS level, a second MCS level, and a third MCS level for compensating the phase noise. Here, the first MCS level corresponds to the case where no reference signal for compensating the phase noise is required, the second MCS level corresponds to the first type reference signal, and the third MCS level corresponds to the second type reference signal.

The memory 1230 serves to store programs and data necessary for the operation of the terminal, and may be divided into a program area and a data area.

Figure 13:
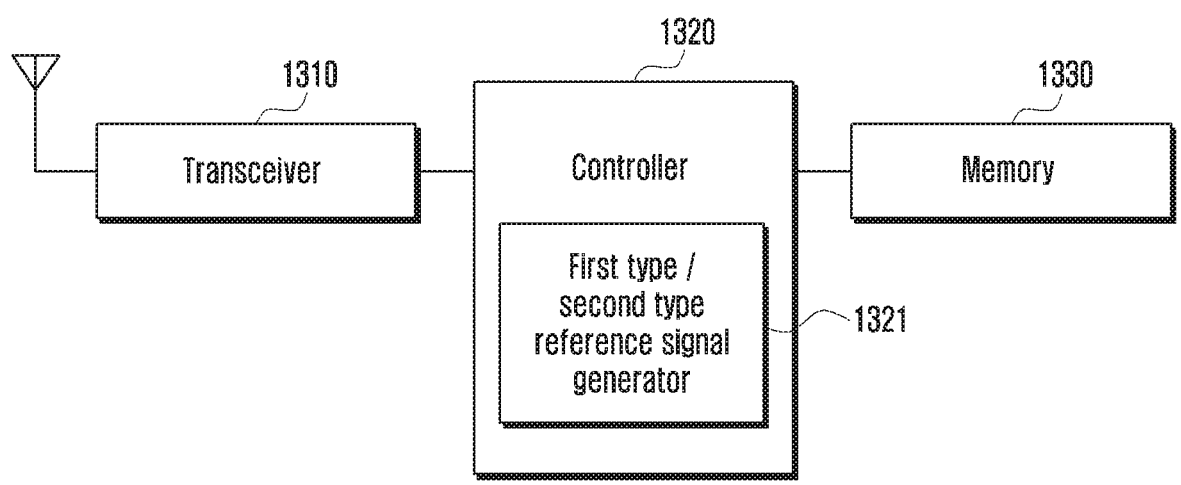
FIG. 13 is a diagram showing a structure of a base station according to an embodiment of the present disclosure.

FIG. 13 shows a structure of a base station according to an embodiment of the present disclosure.

Referring to FIG. 13, a base station may include a transceiver 1310, a controller or at least one processor 1320, and a memory 1330.

The transceiver 1310 serves to transmit/receive the corresponding data for wireless communication of the base station. The transceiver 1310 may transmit/receive a signal to and from other nodes or the terminal. The transceiver 1310 may also include an RF transmitter that up-converts and amplifies a frequency of the transmitted signal, an RF receiver that low-noise-amplifies the received signal and down-converts the frequency, or the like.

Further, the transceiver 1310 may receive data through the radio channel and output the received data to the controller 1320 and transmit the data output from the controller 1320 through the radio channel.

The controller 1320 may control the signal flow between the respective blocks so that the base station may be operated according to any embodiment of the present disclosure. More specifically, the controller 1320 may control the transceiver 1310 to transmit the reference signal to the terminal so that the terminal measures the first CSI, transmit the first type reference signal and the second type reference signal to the terminal so that the terminal estimates the second CSI from the first CSI, and receive the estimated second CSI from the terminal.

The controller 1320 may further include a first type/second type reference signal generator 1321 to perform the function. The first type/second type reference signal generator 1321 may generate the first type reference signal for compensating the CPE, and the second type reference signal for compensating the CPE and the ICI.

The controller 1320 may control the transceiver 1310 to transmit the first type reference signal to the terminal together with the first data and transmit the second type reference signal to the base station together with the second data.

In this case, the first MCS level, the second MCS level, and the third MCS level for compensating the phase noise may be set by the information exchange between the base station and the terminal. Here, the first MCS level may correspond to the case where no reference signal for compensating the phase noise is required, the second MCS level may correspond to the first type reference signal, and the third MCS level may correspond to the second type reference signal.

The memory 1330 serves to store programs and data necessary for the operation of a phase calibration apparatus (not shown) between antennas, and may be divided into a program area and a data area.

While the present disclosure has been shown and described with reference to various embodiments thereof, it will be understood by those skilled in the art that various changes in form and detail may be made therein without departing from the spirit and scope of the present disclosure as defined by the appended claims and their equivalents.

What is claimed is:

1. A method for compensating phase noise of a terminal, comprising:
    measuring first channel state information (CSI) using a reference signal transmitted from a base station;
    receiving a first type reference signal for compensating a common phase error (CPE) and a second type reference signal for compensating the CPE and inter carrier interference (ICI) from the base station;
    estimating a second CSI from the first CSI by compensating phase noise for first data using the first type reference signal and compensating phase noise for second data using the second type reference signal; and
    transmitting the estimated second CSI to the base station,
    wherein the first type reference signal is allocated to consecutive symbols in one subcarrier and the second type reference signal is allocated to consecutive symbols in at least two subcarriers.

2. The method of claim 1, further comprising:
    receiving the first type reference signal from the base station together with the first data; and
    receiving the second type reference signal from the base station together with the second data.

3. The method of claim 1, further comprising:
    setting a first modulation and coding scheme (MCS) level, a second MCS level, and a third MCS level for compensating the phase noise,
    wherein the first MCS level corresponds to a case where no reference signal for compensating the phase noise is required, the second MCS level corresponds to the first type reference signal, and the third MCS level corresponds to the second type reference signal.

4. The method of claim 1, wherein the estimating of the second CSI includes:
    calculating a first error vector magnitude (EVM) value according to a compensation result;
    calculating a second EVM value according to a compensation result; and
    calculating a reference value representing a difference between the first EVM value and the second EVM value.

5. The method of claim 4, wherein the estimating of the second CSI further includes:
    estimating the second CSI using the first CSI, the reference value, and a cyclic redundancy check (CRC) value measured during decoding of the first data and the second data.

6. A method for compensating phase noise of a base station, comprising:
    transmitting a reference signal to a terminal, wherein the terminal is configured to measure first channel state information (CSI);
    transmitting a first type reference signal for compensating a common phase error (CPE) and a second type reference signal for compensating the CPE and inter carrier interference (ICI) to the terminal, wherein a second CSI is estimated from the first CSI by compensating phase noise for first data using the first type reference signal and compensating phase noise for second data using the second type reference signal in the terminal; and
    receiving the estimated second CSI from the terminal,
    wherein the first type reference signal is allocated to consecutive symbols in one subcarrier and the second type reference signal is allocated to consecutive symbols in at least two subcarriers.

7. The method of claim 6, further comprising:
    transmitting the first type reference signal to the terminal together with first data; and
    transmitting the second type reference signal to the terminal together with second data.

8. The method of claim 6, wherein a first modulation and coding scheme (MCS) level, a second MCS level, and a third MCS level for compensating the phase noise are set, and wherein the first MCS level corresponds to a case where no reference signal for compensating the phase noise is required, the second MCS level corresponds to the first type reference signal, and the third MCS level corresponds to the second type reference signal.

9. A terminal for compensating phase noise, comprising:
a transceiver; and
at least one processor coupled with the transceiver and configured to control to:
  measure first channel state information (CSI) using a reference signal transmitted from a base station,
  receive a first type reference signal for compensating a common phase error (CPE) and a second type reference signal for compensating the CPE and inter carrier interference (ICI) from the base station,
  estimate a second CSI from the first CSI by compensating phase noise for first data using the first type reference signal and compensating phase noise for second data using the second type reference signal, and
  transmit the estimated second CSI to the base station,
wherein the first type reference signal is allocated to consecutive symbols in one subcarrier and the second type reference signal is allocated to consecutive symbols in at least two subcarriers.

10. The terminal of claim 9, wherein the at least one processor is further configured to control the transceiver to:
  receive the first type reference signal from the base station together with the first data, and
  receive the second type reference signal from the base station together with the second data.

11. The terminal of claim 9,
wherein the at least one processor is further configured to set a first modulation and coding scheme (MCS) level, a second MCS level, and a third MCS level for compensating the phase noise, and
wherein the first MCS level corresponds to a case where no reference signal for compensating the phase noise is required, the second MCS level corresponds to the first type reference signal, and the third MCS level corresponds to the second type reference signal.

12. The terminal of claim 9, wherein the at least one processor is further configured to:
  calculate a first error vector magnitude (EVM) value according to a compensation result,
  calculate a second EVM value according to a compensation result, and
  calculate a reference value representing a difference between the first EVM value and the second EVM value.

13. The terminal of claim 12, wherein the at least one processor is further configured to estimate the second CSI using the first CSI, the reference value, and a cyclic redundancy check (CRC) value measured during decoding of the first data and the second data.

14. A base station for compensating phase noise, comprising:
a transceiver; and
at least one processor coupled with the transceiver and configured to control to:
  transmit a reference signal to a terminal, wherein the terminal is configured to measure first channel state information (CSI),
  transmit a first type reference signal for compensating a common phase error (CPE) and a second type reference signal for compensating the CPE and inter carrier interference (ICI) to the terminal, wherein a second CSI is estimated from the first CSI by compensating phase noise for first data using the first type reference signal and compensating phase noise for second data using the second type reference signal in the terminal, and
  receive the estimated second CSI from the terminal,
wherein the first type reference signal is allocated to consecutive symbols in one subcarrier and the second type reference signal is allocated to consecutive symbols in at least two subcarriers.

15. The base station of claim 14, wherein the at least one processor is further configured to control the transceiver to:
  transmit the first type reference signal to the terminal together with the first data, and
  transmit the second type reference signal to the terminal together with the second data.

16. The base station of claim 14,
wherein a first modulation and coding scheme (MCS) level, a second MCS level, and a third MCS level for compensating the phase noise are set, and
wherein the first MCS level corresponds to a case where no reference signal for compensating the phase noise is required, the second MCS level corresponds to the first type reference signal, and the third MCS level corresponds to the second type reference signal.

* * * * *